Figure 1:
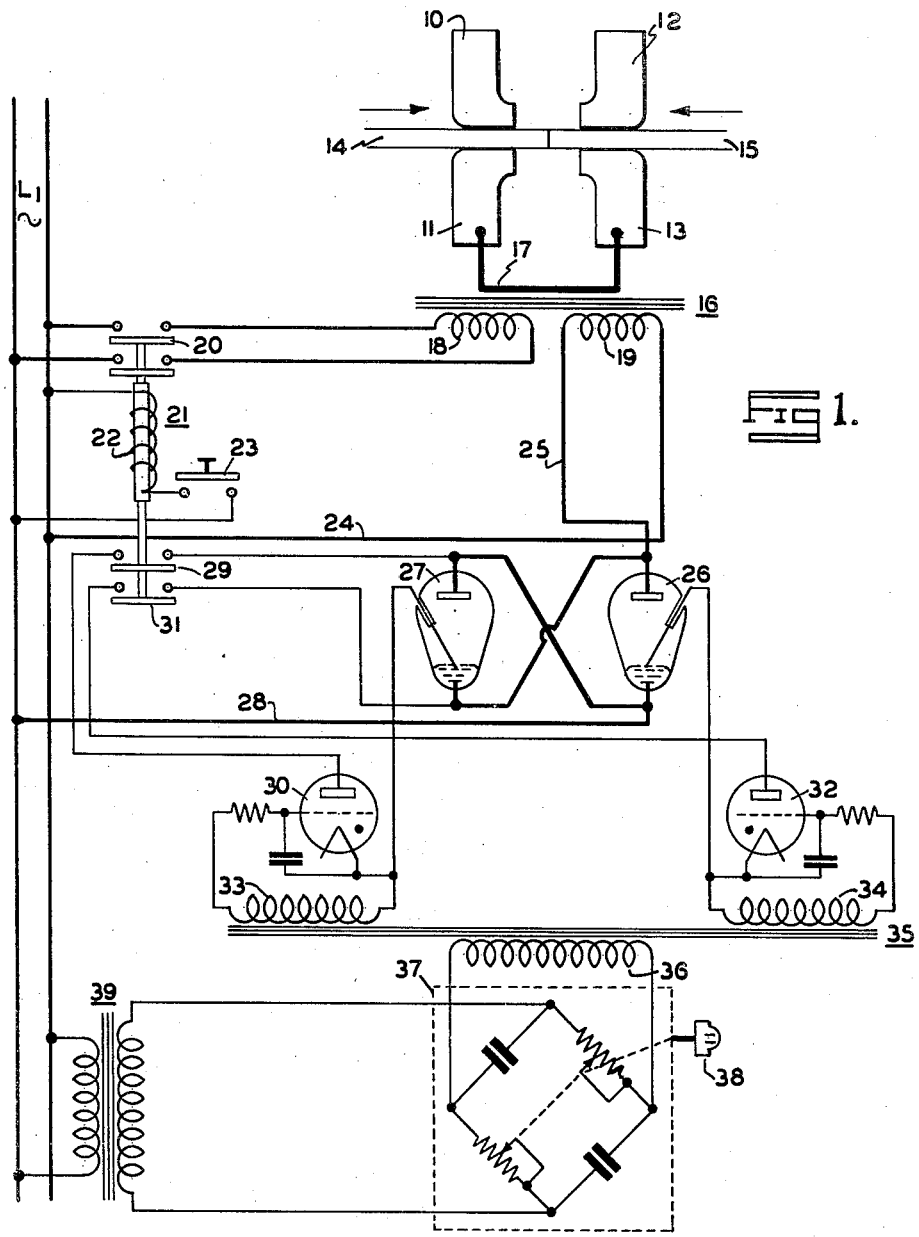

Jan. 1, 1946.  R. L. RINGER, JR  2,392,101
CONTROL OF WELDING CURRENT
Filed July 10, 1943

Inventor
ROBERT LEE RINGER, JR.
By Francis J. Klempay
Attorney

Patented Jan. 1, 1946

2,392,101

UNITED STATES PATENT OFFICE 2,392,101

CONTROL OF WELDING CURRENT

Robert Lee Ringer, Jr., Warren, Ohio, assignor to The Taylor-Winfield Corporation, Warren, Ohio, a corporation of Ohio Application July 10, 1943, Serial No. 494,216

11 Claims. (Cl. 219—4)

This invention relates to electric welding and more particularly to an improved method and apparatus for controlling the effective or root mean square current applied to the pieces to be welded together. In flash welding particularly it is desirable that the currents applied to the electrodes and/or work pieces have such continuous characteristics that the stability of the established arc is not impaired. Commercial alternating current sources normally possess a sufficient degree of continuity to satisfactorily carry out the flash welding process particularly if the whole of the wave is applied to the work. Heretofore, this latter requirement has necessitated the use of tapped transformers or other cumbersome arrangement for varying the current supplied to the work and such prior arrangements do not readily admit of incremental or automatic control.

It is the primary object of the present invention to provide improved current translating apparatus for welding systems and a control for such apparatus whereby the effective or root mean square current applied to the work pieces may be readily, minutely, and if desired automatically, controlled without altering the inherent continuity of the current source.

A further object of the invention is the provision of a method and apparatus having the characteristics outlined above but which may, nevertheless, be practiced and operated with readily available, economical, and dependable electrical equipment. This object of the invention is accomplished, primarily, by controllably depressing the flux wave in a welding transformer without varying the continuity characteristics imparted to the wave by the primary current source. In the preferred embodiment of the invention the flux wave form is determined by a primary winding section connected directly to the current source and a second primary winding section connected in inverse or bucking relation to said source through a heat control system which passes only a predetermined portion of the full or half waves of the source current as will be understood. In this manner the net or resultant flux wave and the consequent secondary current wave is suppressed thus reducing the root mean square value of the secondary current without changing the basic characteristics of the secondary current wave.

Other objects and advantages of the invention will be pointed out below while still others will become apparent upon a consideration of the following detailed specification and the accompanying drawing wherein there is specifically disclosed a preferred embodiment of the invention.

Figure 2:
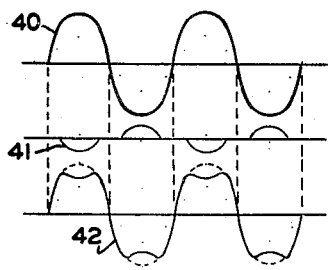

In the drawing:

Figure 1 is a schematic showing of an electric flash welding system constructed in accordance with the principles of the invention; and Figure 2 is a set of curves illustrating the basic principle of the invention.

Referring to the drawing, reference numerals 10 and 11 indicate a pair of work clamping electrodes of a conventional flash welding machine while another pair of work clamping electrodes is shown at 12 and 13. Reference numerals 14 and 15 indicate work pieces held in the respective pairs of electrodes and, in accordance with usual practice, the pairs of electrodes and work pieces held therein are arranged to be moved toward each other to effect the welding together of the pieces. This relative movement is suggested by the arrows in Figure 1.

A welding transformer 16 has its secondary 17 electrically connected to the electrodes 11 and 13 of the welding machine and is provided with a primary having two separate windings or sections 18 and 19. During welding operations primary section 18 is arranged to be directly connected to a source L1 of alternating current through suitable contactors 20 of a relay 21. Relay 21 has an operating coil 22 which is energized upon the closing of a switch 23. Primary section 19 of transformer 16 is connected to the line L1 by means of the valves 26 and 27 but the polarity of section 19 is reversed with respect to that of the section 18 so that the flux induced in transformer 16 by primary section 19 will be in opposition or in bucking relation to flux induced by section 18. Valves 26 and 27 are preferably ignitrons to handle the heavy current normally encountered and are connected in inverse parallel relation for full cycle operation. Thus, a current path drawing a positive half cycle can be traced from L1 through conductor 24, winding 19, conductor 25, ignitron 26, and conductor 28 to L1. During a negative half cycle current will flow from L1 through conductor 28, ignitron 27, conductor 25, winding 19, and conductor 24 to L1.

To control the extent of suppression of the flux wave in transformer 16 and consequently the root mean square value of the current translated the ignitrons 26 and 27 are controlled to pass only predetermined portions of the source current half cycles. This may conveniently be accomplished by employing phase controlled thyratrons 30 and 32 in the ignition circuits for the ignitrons 27 and 26, respectively. A contactor 29 on relay 21 is adapted, upon the closing of switch 23 to connect the plate circuit of thyratron 30 in series with the anode connection and ignition electrode of ignitron 27 while a contactor 31 of relay 21 similarly connects thyratron 32 in the ignition circuit of ignitron 26.

Thyratrons 30 and 32 are rendered conductive at predetermined times in the successive half cycles of the alternating current source by potentials induced in secondaries 33 and 34, respectively, of a transformer 35. The primary 36 of transformer 35 is energized from the alternating current source L1 through transformer 39 and a suitable phase shifting network 37. A control element 38 is provided for the phase shifting device 37 to adjust the potentiometers or other variable elements or element utilized in the device to determine the extent of phase shift of the current supplied to primary 36 of transformer 35. While the control element 38 is shown as a manually rotatable member it will be understood that an automatically or remotely controlled phase shifting arrangement may be utilized to determine the strength of the bucking current furnished the winding 19 and consequently the R. M. S. value of the welding current in response to temperature, time, position, or other condition, if desired.

Figure 2 illustrates the principles of operation of the system described above. Upon closing of switch 23 contactors 20 connect winding 18 with the line as aforesaid while contactors 29 and 31 condition the ignition circuits for the valves 26 and 27. Curve 40 illustrates the nature of the flux wave and consequently the welding current wave which would be attained if the winding 18 only were used in the primary of transformer 16 while curve 41 illustrates the wave of the welding current which would be attained by the use of the winding 19 only if the control therefor were adjusted for low heat. Curve 42 illustrates the net flux and secondary current wave resulting from the simultaneous use of the opposed windings 18 and 19. If the valves 26 and 27 are controlled to complete cut-off maximum welding current values will be attained. By translating more and more of the complete source current wave to the winding 19 the resultant welding current wave will be progressively suppressed thereby progressively decreasing the R. M. S. current furnished the welding load. By properly proportioning windings 18 and 19 a wide range of control may be provided and it will be understood that the welding current may be minutely adjusted throughout the whole of the range. Also the system lends itself readily to automatic control which may be desirable in certain adaptations.

By referring to Figure 2 it will be observed that regardless of the degree of suppression effected by the bucking coil 19 the continuity characteristics of the primary current source, whatever it might be, is substantially unimpaired. The welding current may be decreased substantially without creating zero-current gaps in the wave. It is these gaps or wave forms having substantial intervals of low current values which are objectionable in flash welding as they lead to arc instability and consequently to erratic results.

The above specifically described embodiment of the invention should be considered as illustrative only as obviously many changes may be made therein without departing from the spirit or scope of the invention. For example, the valves 26 and 27 and their control devices may be replaced by a properly controlled saturable reactor to control the current furnished the winding 19. Also, while I have shown the windings or winding sections 18 and 19 of the welding transformer 16 as entirely separate from each other it will be understood that it may be more desirable in actual practice to employ but a single tapped primary winding, the sections on either side of the tap providing the separate windings or winding sections required. Reference should therefore be had to the appended claims in determining the scope of the invention.

What I claim is:

1. In a flash welding system including electrodes and a welding transformer having its secondary connected to the electrodes, means to control the effective current applied to the work comprising a primary winding section for said transformer adapted to be connected to a periodic source of current, a second primary winding section for said transformer means to connect said second section to said source in inverse polarity with respect to said first mentioned section, said last mentioned means being operative to pass only a predetermined portion of the cycles of said source, and means to vary the portions of the cycles of current furnished said second section.

2. In a welding system having a periodic current source and including electrodes and a welding transformer having its secondary winding connected to the electrodes; means to control the effective current translated by said transformer comprising means to induce a variable flux therein having a wave form substantially coincident with the voltage wave form of said periodic current source, means to suppress the peaks of said flux by inducing in said transformer a variable flux of substantially equal periodicity with said first mentioned flux but in opposition thereto, and means to vary the magnitude of said second mentioned flux.

3. The method of controlling the effective flashing current in flash welding which consists of applying to the work during the flashing period a periodic current having a fundamental wave form modified by depression of current peaks thereof, and increasing or decreasing the magnitude of said depression as desired whereby the effective current may be varied under wide limits without increasing the discontinuity characteristic of the current wave form.

4. The method of controlling the effective flashing current in flash welding which consists of applying to the work during the flashing period a periodic current having generally a sine wave form modified by depressing the peaks thereof, and increasing or decreasing the magnitude of peak depression as desired whereby the effective current may be varied under wide limits without increasing the discontinuity characteristic of the current wave form.

5. In a welding system having a periodic current source and including electrodes and a welding transformer having its secondary winding connected to the electrodes, the combination of means to control the effective current translated by said transformer without increasing the degree of secondary current discontinuity resulting from the inherent discontinuous nature of the primary current source comprising means to vary the flux in said transformer in accordance with the current wave of said source, means to vary said flux in inverse wave relation to said current source, and means to determine the portion of the primary current wave so impressed in inverse relation whereby the effective secondary current may be varied without altering the fundamental continuity characteristics thereof.

6. In a flash welding system including electrodes and a welding transformer having its secondary connected to the electrodes, the combination of means to control the effective current translated by said transformer without increasing the degree of secondary current discontinuity resulting from the discontinuous nature of the primary current source comprising means to impress the source current wave on the primary of said transformer, and means to impress a predetermined portion of said source current wave on said primary in opposite direction whereby the effective secondary current is decreased without altering the arc-sustaining characteristics thereof.

7. In a welding system having a periodic current source and including electrodes and a welding transformer having its secondary winding connected to the electrodes, the combination of means to control the effective current translated by said transformer without increasing the degree of secondary current discontinuity resulting from the discontinuous nature of the primary current source comprising means to vary the flux in said transformer in accordance with the current wave of said source, means to vary said flux in inverse wave relation to said current source, and means controlling the extent of said last mentioned variance whereby the effective secondary current may be varied without altering the fundamental continuity characteristics thereof.

8. In a flash welding system including electrodes and a welding transformer having its secondary connected to the electrodes, the combination of means to control the root mean square current translated by said transformer without increasing the degree of secondary current discontinuity resulting from the inherent discontinuous nature of the primary current source comprising means to connect a primary winding of said transformer directly to said source, said transformer having a second primary winding, means to connect said second winding to said source in inverse relation to said first winding, and means including said second mentioned connecting means to apply predetermined portions of the current wave of said source to said second winding.

9. In an electric resistance welding system, apparatus for controlling the effective magnitude of the welding current derived from a periodic current source comprising a transformer adapted to have its secondary winding electrically connected to the work pieces to be welded and having a pair of primary winding sections, means to connect one of said sections to said source so as to induce in said transformer a periodic flux, means to connect the other of said sections to said source in such manner that the periodic flux induced thereby in said transformer is in opposition to the flux induced by the said one of said sections, and means to control the relative effective magnitudes of the currents applied to said sections.

10. In an electric resistance welding system adapted to be energized from an alternating current source the combination of a transformer having a secondary winding adapted to be electrically connected to the work pieces to be welded and having a pair of primary winding sections, means to connect one of said sections to said source, means comprising a pair of reversely connected valves to connect the other of said sections to said source, said sections being oppositely poled whereby the flux set up in said transformer by the said one of said winding sections is bucked down by the flux induced by the other of said winding sections, and means to delay conduction in said valves for predetermined intervals in the respective half cycles of said source whereby the magnitude of the flux set up by the said other of said sections may be varied.

11. In an electric resistance welding system adapted to be energized from a periodic current source the combination of an induction device having a secondary winding to be electrically connected to the work pieces to be welded, means to induce in said device a periodic flux by the flow of current from said source, means to induce in said device by the flow of current from said source a flux having equal periodicity with said source but substantially in opposition to the first mentioned flux, and means to control the effective magnitude of said second mentioned flow of current.

ROBERT LEE RINGER, Jr.